No. 790,692. PATENTED MAY 23, 1905.
E. LAZROWITCH.
HUB FERRULE.
APPLICATION FILED MAR. 6, 1905.
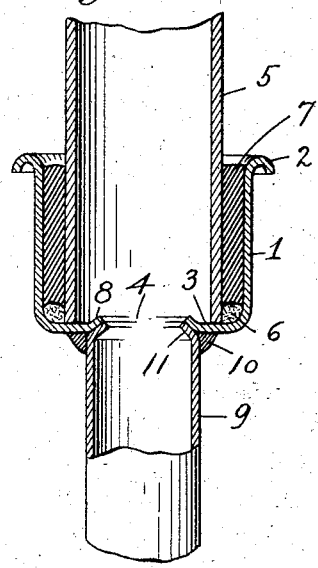
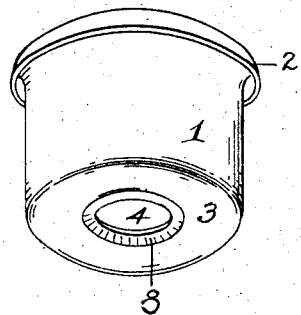
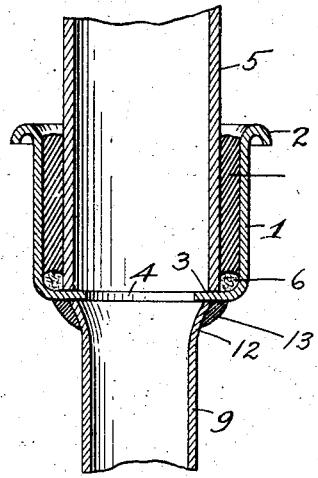
Witnesses:
A. L. Lord
Cassie McElroy
Inventor,
Edward Lazrowitch
By Fouts & Hull,
Attorneys.

No. 790,692.

Patented May 23, 1905.

UNITED STATES PATENT OFFICE.

EDWARD LAZROWITCH, OF CLEVELAND, OHIO, ASSIGNOR OF ONE-THIRD TO EDWARD H. HASEROT AND ONE-THIRD TO EMANUEL LAZROWITCH, OF CLEVELAND, OHIO.

HUB-FERRULE.

SPECIFICATION forming part of Letters Patent No. 790,692, dated May 23, 1905.

Application filed March 6, 1905. Serial No. 248,400.

*To all whom it may concern:*

Be it known that I, EDWARD LAZROWITCH, residing at Cleveland, in the county of Cuyahoga and State of Ohio, have invented a certain new and useful Improvement in Hub-Ferrules, of which the following is a full, clear, and exact description, reference being had to the accompanying drawings.

My invention relates to connections between iron and lead pipes, and particularly to such connections as are adapted to be employed between the traps of sinks, bath-tubs, and water-closets and vent-pipes such as extend through the roofs of houses for carrying off the odors from such traps.

Generally speaking, the invention may be defined as consisting of the combinations of elements for the purpose specified embodied in the claims hereto annexed.

In the drawings, Figure 1 represents a sectional view of my invention, showing the manner in which it is applied as a connection between the lead pipe and iron pipe. Fig. 2 represents a perspective view of the connection, and Fig. 3 represents a sectional view of a modification of the connection shown in the preceding figures.

The connection which I employ for the purpose hereinbefore set forth consists of a combined hub and ferrule consisting of a body 1, preferably cylindrical in shape, having an open upper end provided with a reinforcing flange or bead 2. The lower end of the cylindrical body is partially closed by means of an abrupt flange 3, extending inwardly at substantially right angles to the body and provided at the center thereof with an opening 4 of a size capable of forming a free passage for the gases which accumulate in the trap. The body 1 is of sufficient size to receive therein the iron pipe 5, which connects with the vent-pipe, and to permit said pipe 5 to be seated on the flange or shoulder 3, with sufficient space between said pipe and the body of the connection for the insertion of packing material 6, such as oakum, and the calking material 7, which is of lead, applied in a molten condition. The flange 3 extends inwardly beyond the seat for the pipe 5 for a considerable distance.

The combined hub and ferrule is preferably formed by stamping the same from rolled sheet-brass. This not only secures a material saving of expense, but provides a connection which is free from blow-holes. Moreover, in making such connection from sheet-brass I am enabled to use an alloy containing a considerable quantity of zinc, whereby solder is easily applied and readily adheres to the surface of the connection.

After forming the opening 4 in the bottom flange or shoulder 3 I preferably countersink the flange to form an upwardly-inclined surface 8 at the opening, as shown in Figs. 1 and 2.

The connection hereinbefore described is first secured to the lead pipe 9, which is connected with the trap by means of a wiped joint 10. In forming such joint the upper end of the lead pipe is drawn in or contracted, as shown at 11, to conform to the inclined surface 8, adjacent the opening 4. Solder may then be applied to the inclined surfaces, and the pipe may then be further secured to the connection by the wiped joint 10. The lead pipe 9 may now be bent up into position to receive the iron pipe 5, which is secured in place in the manner hereinbefore described. The provision of the inclined surface 8, adjacent the opening 4, forms, in connection with the corresponding surface 11 of the pipe 9, a rigid support for the hub and ferrule during the operation of calking the pipe 5 in place and permits such calking to be accomplished without injury to the joint 10. The rolled flange 2 prevents the spreading or cracking of the hub during the calking operation.

In Fig. 3 I have shown a modification of the form of connection illustrated in Figs. 1 and 2. In the last figure the connection is provided with a cylindrical body 1 and a reinforcing-flange 2, as in the former modification; but the abrupt flange 3 is not countersunk adjacent to the opening 4 therethrough.

In securing the lead pipe 9 to the connection 1 the upper end of said pipe may be expanded or flared outwardly at 12 and secured to the under side of said flange by means of the wiped joint 13. This construction also provides a rigid support for the connection during the operation of calking the pipe 5 in place.

I am aware of the fact that it has been proposed to provide a connection consisting of a cast cylindrical hub wherein the iron pipe may be inserted and calked in place and to provide such hub with a depending skirt to which the lead pipe may be secured. A hub having such skirt, however, is difficult of production from a rolled brass plate, and even if it were possible to produce the same by stamping it is relatively much more expensive of production than is my connection. Moreover, it is more difficult of application to the iron pipe after it has been soldered to the lead pipe and does not produce as good or tight a joint with said lead pipe as does my connection.

Having thus described my invention, what I claim as new, and desire to secure by Letters Patent, is—

1. A combined calking hub and ferrule for connecting a lead pipe and an iron pipe, said hub or ferrule comprising a hollow brass body of sufficient diameter to receive the end of the iron pipe therein with a space between said pipe and the inner wall thereof for the reception of calking material, an inwardly-directed annular flange or shoulder at right angles to the direction of the said iron pipe to form a seat therefor, the outer surface of said flange or shoulder providing a surface whereto the lead pipe may be soldered, substantially as specified.

2. A connection for lead and iron pipes, said connection consisting of a combined hub and ferrule stamped from rolled brass, said connection comprising a substantially cylindrical body having a reinforcing flange at its upper end and a shoulder or flange extending inwardly at right angles to the body of said cylindrical portion and having an opening through the central portion thereof, said body being of sufficient diameter to receive therein the end of the iron pipe with sufficient space between said pipe and the body for the application of calking material, said flange being of sufficient extent to receive and support the end of said pipe and the lower surface of said flange providing a surface adjacent the opening to which the lead pipe may be soldered, substantially as specified.

3. A connection for the purpose specified, said connection comprising a cylindrical body of sufficient diameter to receive the end of an iron pipe with a space between said pipe and said body for the reception of calking material, an abrupt inwardly-directed shoulder or flange extending inwardly from the bottom of said body at substantially right angles thereto to a point within the place occupied by the lower end of said iron pipe and there provided with a central opening, the said flange or shoulder being countersunk or upwardly inclined at said opening, whereby an inclined seat is provided for the upper end of the lead pipe, substantially as specified.

4. In a joint for connecting a lead pipe with an iron pipe, the combination with said pipes, of a stamped brass connection having a hollow body adapted to receive the iron pipe therein and of a size to provide a space between said pipe and the inner wall of said body and having an abrupt inwardly-directed annular shoulder or flange at substantially right angles to said iron pipe, the lower surface of said shoulder or flange forming an abutting and soldering-surface for the lead pipe, substantially as specified.

5. In a pipe-joint for connecting a lead branch pipe with an iron pipe, the combination with said pipes of a brass connection having a hub which receives the iron pipe from above and being of sufficient internal diameter to provide a space between said iron pipe and the inner surface thereof for receiving and retaining calking material, an abrupt inwardly-directed shoulder against which said iron pipe abuts, said flange or shoulder projecting inwardly beyond the point of support of the iron pipe and having an opening therethrough within said pipe, said flange being countersunk or upwardly inclined at said opening, and a lead pipe having its upper end drawn in to form an inclined surface at said opening, whereby said lead pipe may be centered by said flange and an extended soldering-surface provided, substantially as specified.

In testimony whereof I affix my signature in the presence of two witnesses.

EDWARD LAZROWITCH.

Witnesses:
C. McELROY,
J. B. HULL.